(12) United States Patent
Perry et al.

(10) Patent No.: US 12,068,692 B2
(45) Date of Patent: Aug. 20, 2024

(54) MULTI SLOPE OUTPUT IMPEDANCE CONTROLLER TO REDUCE CURRENT IMBALANCE IN A MASTERLESS CONFIGURATION OF N PARALLEL-CONNECTED POWER CONVERTERS AND IMPROVE LOAD REGULATION IN A SINGLE POWER CONVERTER

(71) Applicant: Raytheon Company, Waltham, MA (US)

(72) Inventors: Marty Perry, Tucson, AZ (US); Robert J. Schaller, Tucson, AZ (US)

(73) Assignee: Raytheon Company, Tewksbury, MA (US)

(*) Notice: Subject to any disclaimer, the term of this patent is extended or adjusted under 35 U.S.C. 154(b) by 61 days.

(21) Appl. No.: 17/694,338

(22) Filed: Mar. 14, 2022

(65) Prior Publication Data

US 2023/0188040 A1    Jun. 15, 2023

Related U.S. Application Data

(60) Provisional application No. 63/289,884, filed on Dec. 15, 2021.

(51) Int. Cl.
*H02M 3/158*   (2006.01)
*H02M 1/00*    (2007.01)
*H02M 1/36*    (2007.01)

(52) U.S. Cl.
CPC ....... *H02M 3/1584* (2013.01); *H02M 1/0009* (2021.05); *H02M 1/36* (2013.01)

(58) Field of Classification Search
CPC .. H02M 3/158; H02M 1/0009; H02M 1/0025; H02M 1/08; H02M 1/36
See application file for complete search history.

(56) References Cited

U.S. PATENT DOCUMENTS

| | | | |
|---|---|---|---|
| 5,036,452 A | 7/1991 | Loftus | |
| 6,903,946 B1* | 6/2005 | Wu | H02M 3/1584 363/71 |

(Continued)

FOREIGN PATENT DOCUMENTS

| | | | |
|---|---|---|---|
| CN | 106961101 A | * | 7/2017 |
| CN | 111812525 A | | 10/2020 |

(Continued)

OTHER PUBLICATIONS

"International Application Serial No. PCT/US2022/052849, International Search Report mailed Mar. 29, 2023", 4 pgs.

(Continued)

*Primary Examiner* — Gustavo A Rosario-Benitez
(74) *Attorney, Agent, or Firm* — Schwegman Lundberg & Woessner, P.A.

(57) ABSTRACT

A multi slope output impedance controller is configured to vary the effective impedance $Zeff\_n$ of a power converter to reduce a current imbalance between power supplies in a masterless configuration of N parallel-connected power supplies while maintaining load regulation during start-up and steady-state operation. Generally speaking, the controller commands a high value of $Zeff\_n$ when $Iout\_n$ is low to facilitate current sharing and reduce current imbalance Ib between the power supplies and commands a low value of $Zeff\_n$ when $Iout\_n$ is high to improve load regulation.

19 Claims, 12 Drawing Sheets

(56) References Cited

U.S. PATENT DOCUMENTS

| | | | |
|---|---|---|---|
| 9,748,846 B2 | 8/2017 | Jiang et al. | |
| 2004/0264219 A1* | 12/2004 | Zhang | H02J 1/001 363/21.06 |
| 2005/0206358 A1* | 9/2005 | Van Der Horn | H02M 3/156 323/282 |
| 2009/0218885 A1* | 9/2009 | Ho | H02M 3/1584 323/298 |
| 2010/0013307 A1* | 1/2010 | Heineman | H02J 1/001 307/33 |
| 2013/0285460 A1* | 10/2013 | DeHaven | H02M 3/285 307/82 |
| 2014/0032942 A1* | 1/2014 | Takehara | G06F 1/26 713/300 |
| 2018/0041173 A1 | 2/2018 | Marchais et al. | |
| 2019/0207523 A1* | 7/2019 | Oe | H02M 1/143 |
| 2020/0251909 A1 | 8/2020 | Falk et al. | |
| 2020/0303922 A1* | 9/2020 | Fukuhara | H02J 1/102 |
| 2023/0147990 A1* | 5/2023 | Lin | H02M 3/1584 323/234 |

FOREIGN PATENT DOCUMENTS

| | | |
|---|---|---|
| EP | 3447882 A1 | 2/2019 |
| TW | 200841563 A | 10/2008 |
| TW | 202327233 A | 7/2023 |
| WO | WO-2016190031 A1 | 12/2016 |
| WO | WO-2023114303 A1 | 6/2023 |

OTHER PUBLICATIONS

"International Application Serial No. PCT/US2022/052849, Written Opinion mailed Mar. 29, 2023", 8 pgs.

"Taiwanese Application Serial No. 111147833, Office Action mailed Nov. 21, 2023", w/ English Translation, 14 pgs.

Yun, Wei Li, et al., "Control and Resonance Damping of Voltage-Source and Current-Source Converters With Filters", Piscataway, NJ, USA, vol. 56, No. 5, (May 1, 2009), 11 pgs.

* cited by examiner

MULTI SLOPE OUTPUT IMPEDANCE CONTROLLER TO REDUCE CURRENT IMBALANCE IN A MASTERLESS CONFIGURATION OF N PARALLEL-CONNECTED POWER CONVERTERS AND IMPROVE LOAD REGULATION IN A SINGLE POWER CONVERTER

CROSS-REFERENCE TO RELATED APPLICATIONS

This application claims benefit of priority under 35 U.S.C. 119(e) to U.S. Provisional Application No. 63/289,884 entitled "Multi Slope Output Impedance Controller" and filed on Dec. 15, 2021, the entire contents of which are incorporated by reference.

BACKGROUND OF THE INVENTION

Field of the Invention

This invention relates to regulated power supplies capable of supplying a range of load currents to a load and more particularly to a masterless configuration of N parallel-connected power supplies each of which includes a passively or synchronously rectified power converter connected in a negative feedback loop to facilitate sharing of the load current and maintain regulation of the output voltage.

Description of the Related Art

A power supply may include a power converter that converts an unregulated DC input voltage Vin to a regulated DC output voltage Vout, usually at a different level, for supplying a range of load currents IL to a load. A vast variety of topologies for power converters have been introduced over the years. Further, the need for small size and high efficiency places additional limitations on the available topologies. Small size equates to high power density, and power density is the ratio of output power capability to converter volume.

A switching power converter (SPC) has an energy storage section and a switching control circuit such as a pulse width modulator (PWM), a primary switch, and a rectifier. The energy storage section is responsive to the selective application of the DC input voltage to produce a current and the regulated DC output voltage. The switching control circuit, primary switch and rectifier control the application of the DC input voltage to the energy storage section to set the value of the regulated DC output voltage.

Synchronous rectification has become a desirable alternative to passive rectifiers in power converters due to the increased power conversion efficiency that results at least in part from reduced power losses and higher density. While diodes only permit current flow in one direction, synchronous rectifiers such as MOSFETs, or other equivalent active switches permit current flow in either direction Power supplies based on modular power converters are desirable as they allow sharing of power loads across multiple units and allow flexibility to scale the power solution for a variety of applications. As shown in FIG. 1, a power supply 100 includes N parallel-connected power converters 102 that draw energy from a voltage source Vin with their outputs in parallel powering a common load 104. The power supply 100 produces a regulated output voltage Vout across the load 104 and supplies a load current Il to the load over a specified range of current levels. Each power converter 102 is configured to produce a regulated voltage Vreg_n and an output current Iout_n through an output impedance Zout_n. Ideally each power converter supplies 1/N of the load current IL. To minimize the complexity and enhance the scalability at the array level it is desirable to parallel the power converters in a masterless configuration where the converters share load current without load current information needing to be communicated to the various modules or having special control modules that manage load sharing.

As shown in FIG. 2, a power supply 200 includes N=2 parallel-connected power converters 202 in a masterless configuration to regulate an output voltage Vout and supply load current IL to a load 204. Each power converter 202 is depicted as a dependent source 205 in which a command voltage Vx_n is multiplied by a gain $\alpha\_n$ to produce a controllable voltage Vc_n and is characterized by an open-loop output impedance Zout_OL. The existence of energy source Vin is presumed in a dependent source.

To improve regulation, closed loop control with negative feedback is typically applied to the open loop power converter. A negative feedback controller 206 will force the output voltage Vreg_n of the power converter to be equal to a setpoint voltage V_setpoint_n, which is offset from the reference voltage Vref_n. An output impedance controller 208 is coupled to Vref_n and responsive to a sense current Isense_n, which is indicative of Iout_n, to generate an offset to form V_setpoint_n. A feature of negative feedback is to lower the open loop output impedance Zout_OL of the power converter by the loop gain of the negative feedback controller. If the negative feedback controller has an open loop gain of T then the closed loop output impedance of the power converter will be:

$$Zout_{CL} = \frac{Zout\_OL}{1+T}$$

For example if T+1=60 dB then the open loop output impedance of the converter would be reduced by factor of 1000.

An output impedance controller 208 is coupled to Vref_n and responsive to a sense current Isense_n, which is indicative of Iout_n, to generate an offset to form V_setpoint_n. Controller 208 maintains a constant effective output impedance Zeff_n from $Zout_{CL}$ for the power converter over the range of load currents. A typical controller 208 includes a current amplifier that compares Isense_n to a current reference (e.g. the midpoint of the load current range), a fixed gain amplifier to amplify the error signal, a filter that fixes a bandwidth of the output impedance control loop to be less than the bandwidth of the negative feedback loop that controls Vout and an amplifier produce the offset to generate V_setpoint_n. Typically, the bandwidth of the negative feedback loop drops as the load current is reduced. Therefore, the fixed bandwidth of the output impedance control loop must be set to be less than the bandwidth of the negative feedback loop for the lowest supported load current to avoid interaction between the control loops.

Ideally, all of the power converters 202 would have the exact same reference voltage, negative feedback loop etc. and would share the load current equally during start-up and steady-state over the entire supported range of load currents. However, in a masterless configuration each converter has its own Vref, which will vary within a specified tolerance, non-linearities, etc. This can lead to a current imbalance Ib among the power converters that leads to power inefficiency, stress on individual converters or a failure and shutdown of the power supply. In passively rectified power converters, at low load current IL and low Iout_n one power converter may dominate and supply 100% of the load current while the other power converters turn off. In synchronously rectified power converters, at low Iout_n a circulating current Ic will flow between the power converters. If Vc_1 does not exactly match Vc_2 due to differences in Vx1 and Vx2 or slight differences in $\alpha\_1$ and $\alpha\_2$ then a circulating current Ic will flow between the two converters:

$$Ic = \frac{Vc\_1 - Vc\_2}{Zout\_1 + Zout\_2}$$

where Zout_n=Zeff_n at this point. Once the output voltages of the power converters are well regulated and their output currents Iout_n>2*IC under a no load condition then Ic under load will be approximately zero.

As shown in FIG. 3, a common technique to force the N power converters to reach equilibrium in which all of the power converters share the load current IL and are balanced to share equally e.g., (1/N)*IL is referred to as "droop share". An output load line 300 that plots Vout versus Iload has a negative slope such that the output voltage of each power converter is reduced as its output current is increased. The slope of the load line is the total output impedance. An individual power converter will tend to dominate if its Vref, hence Vsetpoint and Vreg are relatively high. However, because of the load line implemented by the negative feedback control loop, the output current Iout flowing through the total output impedance will tend to pull the voltage down. Once Tout is sufficiently high, the power converter's output voltage will drop to a point that the other power converters will turn on and start to supply load current. The masterless power converters respond independently but together reach an equilibrium at which all share, and share approximately equally, to supply the load current.

As shown in FIG. 2, each power converter 202 may include an additional external output impedance Zext_n outside the control loop connection such that Zout_n=Zeff_n+Zext_n. In this case the desired output impedance of the converter is significantly more complicated than the standard droop share technique can accommodate. Output impedances outside the control loop are commonly found in parallel array power systems and or converters that use primary side regulation. This impedance may also be provided by physical connections between the output of the power converter and the load terminal. All power supplies will exhibit some degree of external output impedance, the issue is whether its significant enough to affect control.

During power converter startup, the output voltage of each converter is ramped from an initial value e.g., zero volts to the final setpoint voltage, by ramping the Vref_n. The "ramp" may be linear, a sequence of steps or a higher order function. When parallel converters are started in a masterless system, slight errors in the ramp rates of the converters and non-linear effects can create significant current imbalance Ib. For a masterless configuration of passively rectified power converters, the result will typically be that a single power converter will turn on and supply the load current as the output voltage is ramped up. Only when the load current, hence individual output currents Iout_n, are high enough will droop share be effective to turn on the other power converters and force sharing. As shown in FIG. 4, for a masterless configuration of two synchronously rectified power converters, starting with non-equal start times, linearity and ramp rates for Vc_1 and Vc_2 can produce a difference voltage 400 that can cause significant circulating current Ic 402 to flow between the converters. In both cases the output impedance of the power converters Zout_n 404 is a fixed value equal to the sum of Zeff_n and Zext_n.

During steady-state, the power supply and the individual power converters will be required to source varying amounts of load current IL over a specified range while maintaining regulation of the output voltage Vout. For passively rectified converters, if the load current IL, hence the individual output currents Iout_n, are too small droop share can fail resulting in either one or a small number of the converters supplying the load current. In general, Iload has to exceed a certain value before all of the converters turn on and share the load current. As shown in FIG. 5, for synchronously rectified converters, if the load current IL, hence the individual output currents Iout_n, are too small a circulating current Ic 500 will flow between the converters. In general, the Ic during steady-state will be much less than that during start-up because the converters should be well-regulated. In general, Iload>2*Ic under no load conditions before Ic under load will approximate zero. In both cases the output impedance of the power converters Zout_n 502 is a fixed value equal to the sum of Zeff_n and Zext_n.

Known techniques pick a fixed value of Zeff that balances the competing requirements during start-up and steady-state to facilitate sharing, limit the current imbalance and maintain load regulation. A larger value of Zeff improves droop share to facilitate sharing at start-up or for low levels of load current and reduce current imbalance Ib while a smaller value of Zeff improves load regulation. The two must be compromised.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a multi slope output impedance controller capable of varying the effective impedance Zeff of a power converter to reduce a current imbalance between power supplies in a masterless configuration of N parallel-connected power supplies while maintaining load regulation or of setting a negative Zeff to optimize load regulation for a single power converter.

In an embodiment, a regulated power supply includes a plurality N of parallel-connected power supplies in a masterless configuration configured to supply power to a load terminal. Each power supply includes a power converter connected in a negative feedback loop with its own reference voltage Vref_n to supply an output current Iout_n through an external output impedance Zext_n (outside the negative feedback loop) to the load terminal. Acting independently the N power supplies together share the load current IL over a range of load currents and provide a regulated output voltage Vout over that range. The negative feedback loop is configurable to vary an effective output impedance Zeff_n of the power converter responsive to Iout_n to reduce the current imbalance Ib between the power supplies during start-up and steady-state while maintaining load regulation.

In an embodiment of the masterless configuration of N parallel-connected power supplies, each power converter is responsive to a command Vx_n to generate a controllable voltage Vc_n across Zeff_n to supply Iout_n at an output that is coupled through Zext_n to the load terminal. A negative feedback controller is configured to provide the negative feedback loop in which a regulated voltage Vreg_n at the output is compared to a setpoint voltage Vsetpoint_n (offset from Vref_n) to control command Vx_n to maintain regulation of Vreg_n and output voltage Vout at the load terminal for varying load currents IL. A multi slope output impedance controller is configured to sense a current Isense_n indicative of Iout_n to control Vsetpoint_n such that Vreg_n is reduced as Iout_n is increased to facilitate load current sharing among the plurality of power supplies (common droop share), command a high value of Zeff_n when Iout_n is less than a specified value to reduce a current imbalance Ib between the power supplies and to command a low value of Zeff_n when Iout_n is greater than the specified value to improve the regulation of Vout. The controller may command a low value of Zeff_n that is negative to partially offset Zext_n during steady-state to optimize regulation.

In an embodiment, the multi slope output impedance controller includes a coefficient generator controller (CGC) responsive to Isense_n, the switching frequency and voltage reference Vref_n to generate a current reference, a gain command, a filter command and a setpoint command. A current error amplifier compares Isense_n to the current reference to generate an error signal, a programmable gain amplifier responsive to the gain command commands the high and low values of Zeff_n amplifies the error signal, a filter responsive to the filter command filters the amplified error signal to limit a bandwidth of an output impedance control loop to be less than a bandwidth of the negative feedback loop that controls Vreg, and an amplifier responsive to the filtered amplified error signal and the setpoint command generates the setpoint voltage Vsetpoint_n such that when Isense_n is greater than the current reference the setpoint voltage Vsetpoint_n is reduced. The filter command is preferably generated such that the bandwidth of the output impedance control loop tracks the bandwidth of the negative feedback loop that controls Vreg up and down to better optimize performance over the range of supported load currents.

The power converters may be implemented as passively or synchronously rectified power converters. A passively rectified power converter is a single quadrant converter in which diodes may sink or source current but not both. At low levels of Iout_n, either during start-up or steady-state, this may manifest in one power converter supplying 100% of the load current with the other power converters turned off. Switching Zeff_n to a high value at low levels of Iout_n will force sharing of the load current among all of the power converters even at low levels of Iout_n and IL, preferably across the entire range of supported load currents. Switching Zeff_n to a low level when Iout_n is sufficiently large (and Vreg_n are sufficiently regulated), will improve the steady-state regulation. A synchronously rectified power converter is two quadrant converter in which active switches (synchronous rectifiers) may sink or source current. At low levels of Iout_n, either during start-up or steady-state, this may manifest in a circulating current Ic flowing among the power supplies. Switching Zeff_n to a high value at low levels of Iout_n will minimize Ic. Switching Zeff_n to a low level when Iout_n is sufficiently large (and Vreg_n are sufficiently regulated) that Ic is approximately zero (e.g., when Iout_n>2*Ic no load), will improve the steady-state regulation. In the case of passive rectification, the current imbalance Ib is the difference between how much of the load current each supply provides. In the case of synchronous rectification, the current imbalance Ib is the circulating current Ic.

At start-up, each controller is responsive to a start sync command to implement a start-up procedure to generate the command Vx_n to ramp voltage Vc_n, hence the regulated voltage Vreg_n up from an initial start value (e.g. 0 Volts) to an initial value for the setpoint voltage Vsetpoint_n while commanding Zeff_n to move from the high value to the low value over a start-up period. Preferably the N power converters receive a common start sync command to synchronize the ramping up of Vc_n. The "ramp" may be linear, a sequence of steps or a higher order function. The transition of Zeff_n may be a step, sequence of steps, piece-wise linear or a linear or higher order function. Because start-up is controlled, the transition may be tied to time over the start-up period as a proxy for the value of Iout_n. Alternately, the controller could execute the transitions as a function of Isense_n as indicative of Iout_n.

At steady-state, command Vx_n is generated to control Vc_n to control regulation of Vout while commanding Zeff_n in response to Isense to move between the high and lows values as Isense changes such that Zeff_n decreases as Iout_n increases to force sharing and reduce current imbalance at low levels of load current and improve regulation at higher levels of load current. The transition of Zeff_n may be a step, sequence of steps, piece-wise linear or a linear or higher order function.

In an embodiment, the multi slope output impedance controller is configurable to implement both the start-up and steady-state procedures to reduce the current imbalance and maintain load regulation.

In an embodiment, the multi slope output impedance controller is configurable via a mode input to implement control either for a masterless configuration of N parallel-connected power converters to reduce current imbalance during start-up and steady-state or for a single power converter to optimize load regulation over the range of supported load currents.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a multi slope output impedance controller capable of varying the effective impedance Zeff of a power converter to reduce a current imbalance between power supplies in a masterless configuration of N parallel-connected power supplies while maintaining load regulation during start-up and steady-state operation. Generally speaking, the controller commands a high value of Zeff_n when Iout_n is low to facilitate current sharing and reduce current imbalance Ib and commands a low value of Zeff_n when Iout_n is high to improve load regulation.

Figure 1:
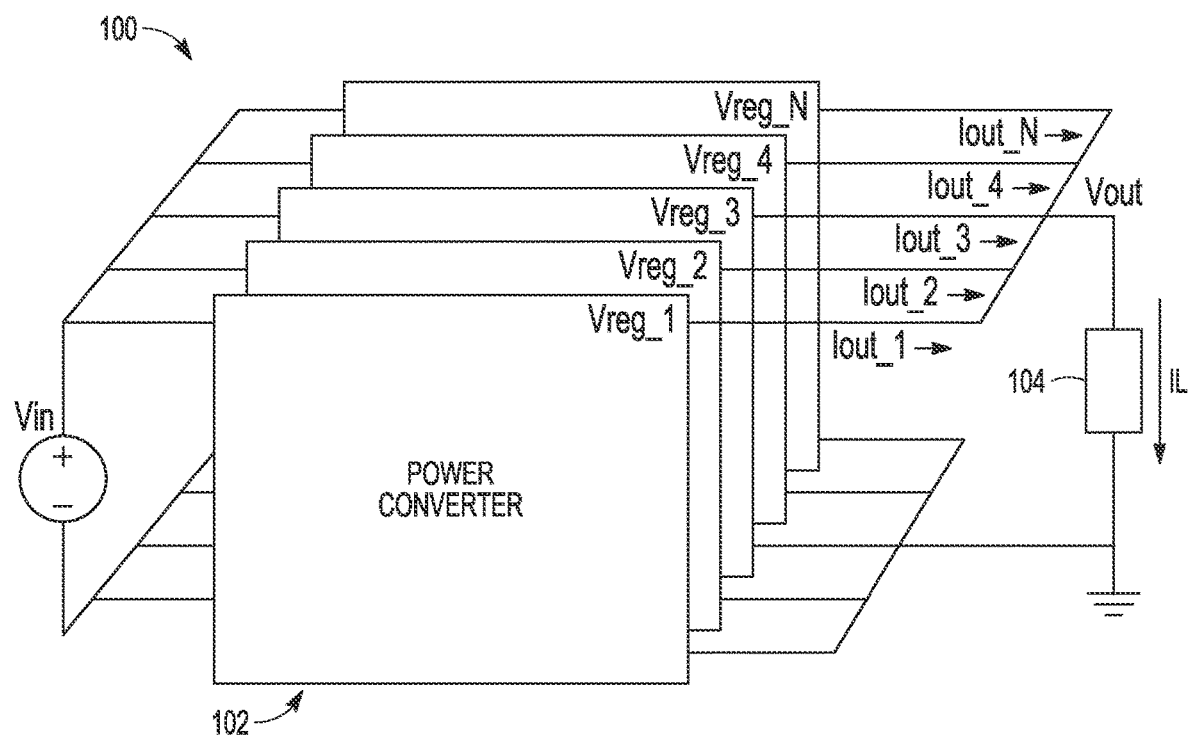
FIG. 1, as described above, illustrates a regulated power supply in which a masterless configuration of parallel-connected power supplies supply current to a common load.
Figure 2:
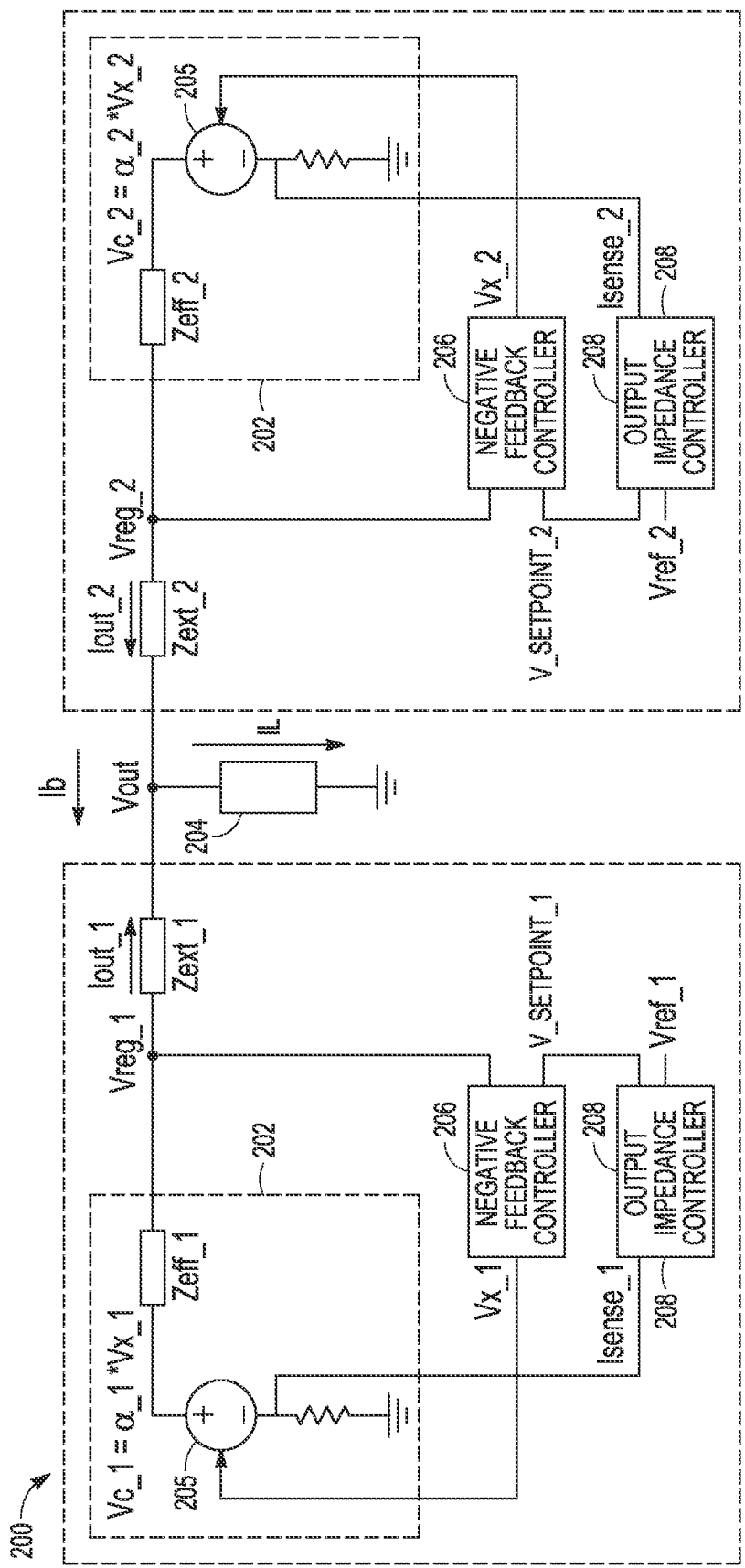
FIG. 2, as described above, illustrates a pair of parallel-connected power supplies in which each power supply includes a power converter, a negative feedback loop to maintain a fixed output impedance to improve regulation and an external impedance connected to the load terminal.
Figure 3:
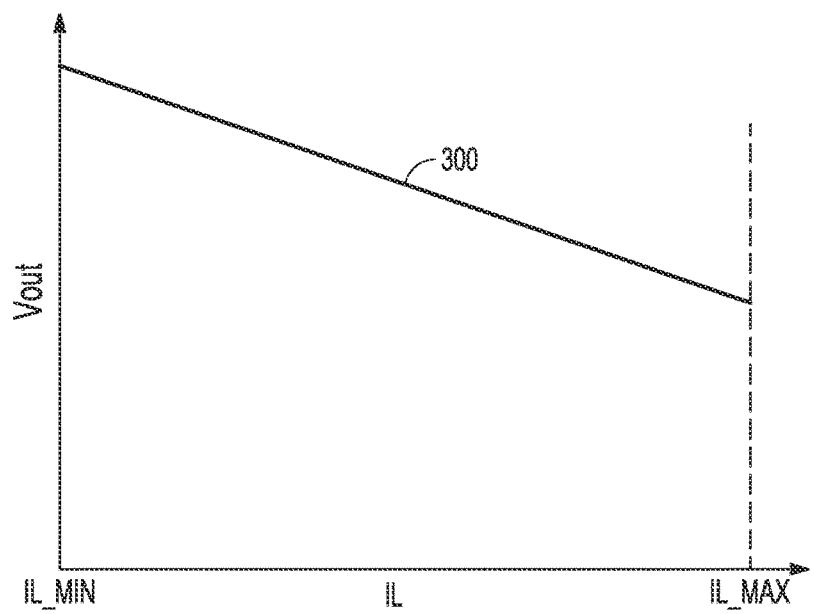
FIG. 3, as described above, is a plot of the output voltage Vout versus load current Iload illustrating a common droop share characteristic to facilitate sharing of the load current among the parallel-connected power supplies.
Figure 4:
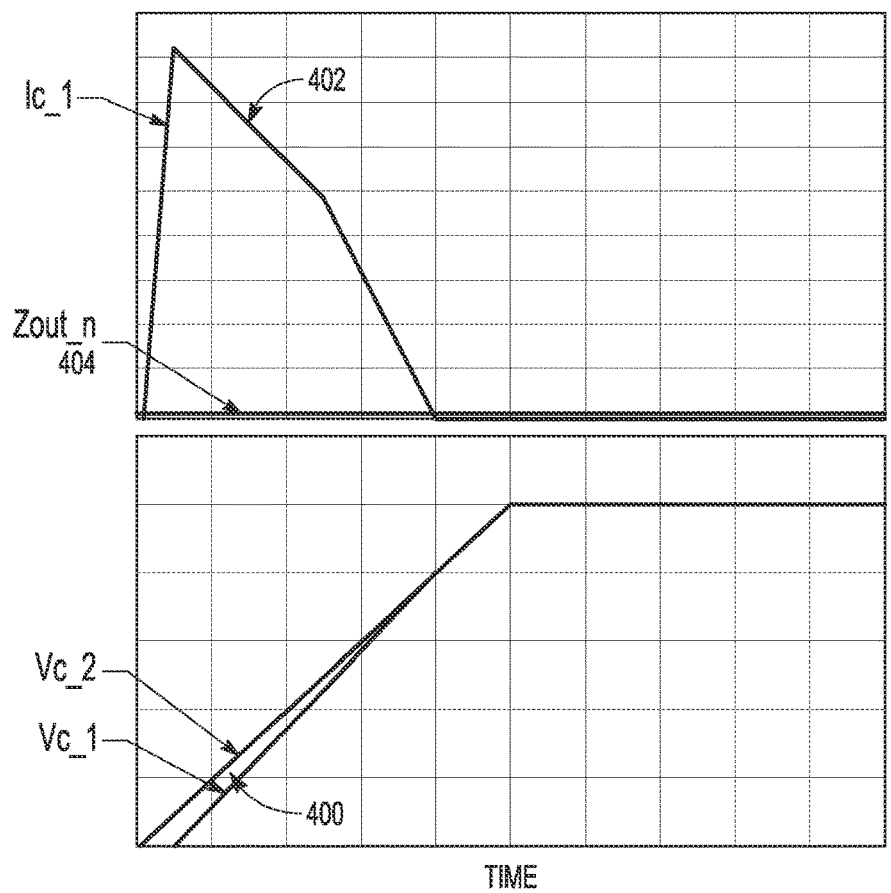
FIG. 4, as described above, is a plot illustrating a circulating current Ic between the actively-switched power converters during start-up in which the power converter is actively switched.
Figure 5:
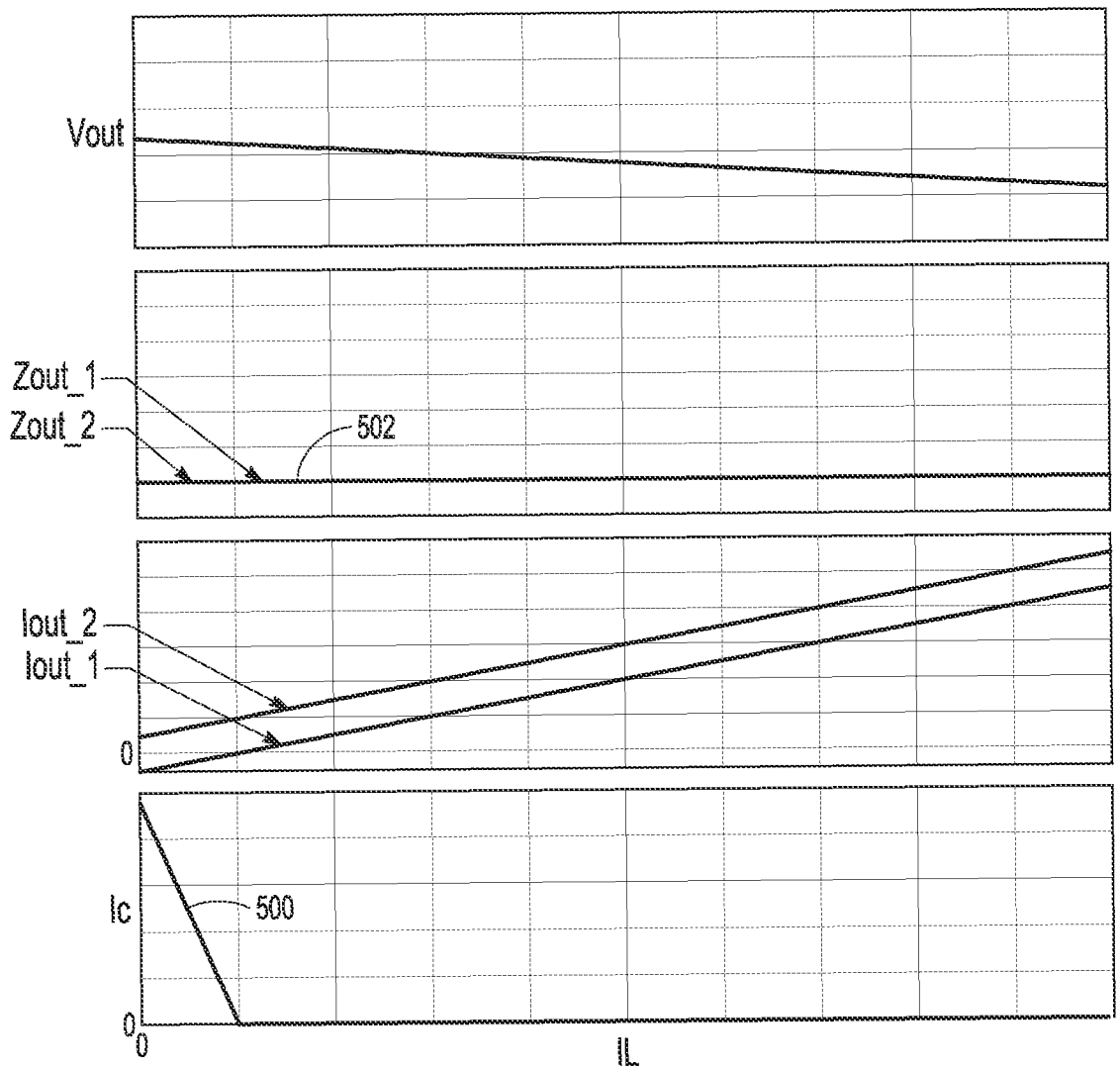
FIG. 5, as described above, is a plot illustrating a circulating current Ic between the actively-switched power converters during steady-state.
Figure 6:
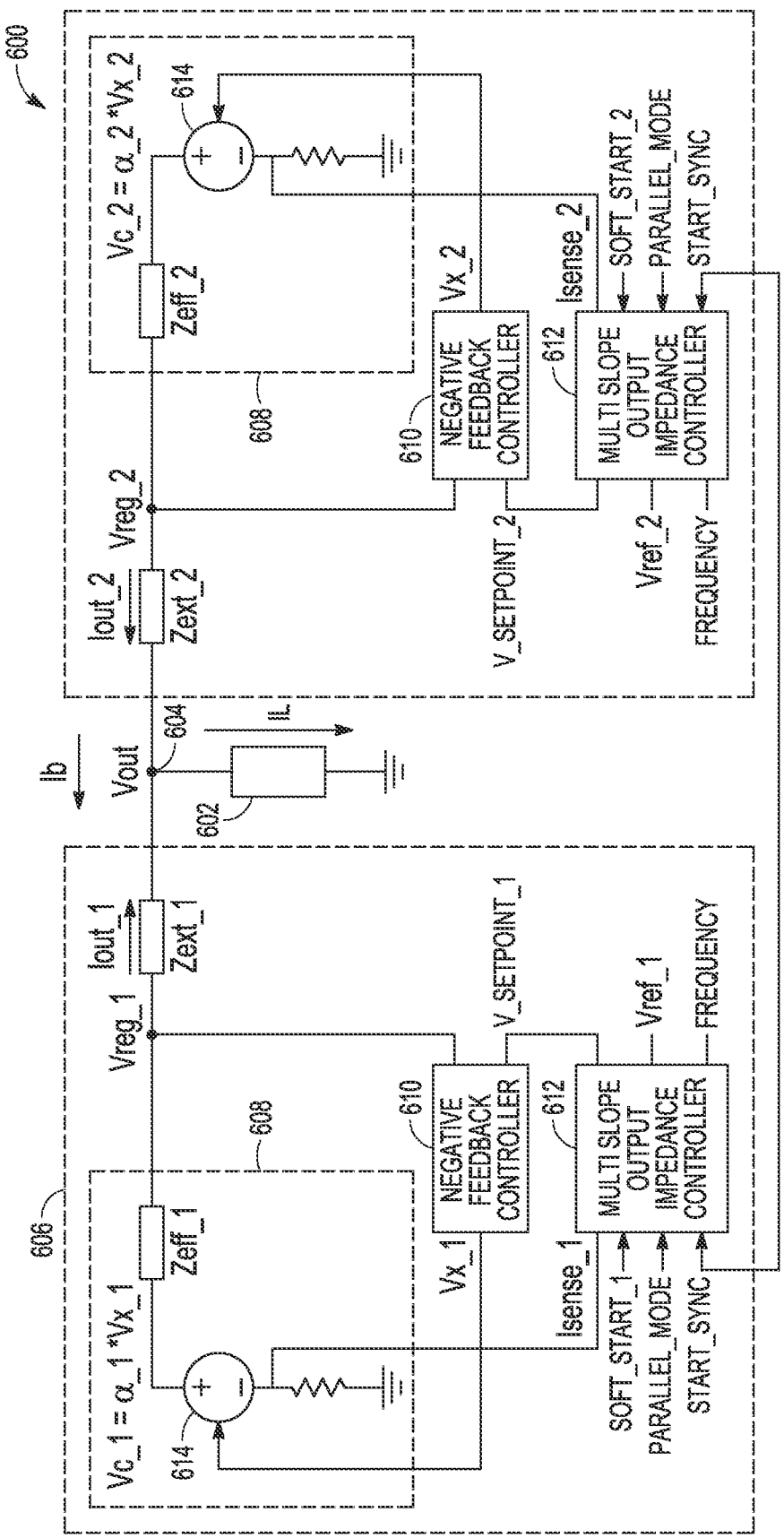
FIG. 6 illustrates an embodiment of the invention in which each power supply includes a power converter, a negative feedback loop to control a variable output impedance to reduce a current imbalance between the power supplies and improve steady-state regulation.

Referring now to FIG. 6, an embodiment of regulated power supply 600 is configured to supply power (e.g, a load current IL at a regulated output voltage Vout) to a common load 602 connected at a load terminal 604. Power supply 600 includes a plurality N of parallel-connected power supplies 606 in a masterless configuration configured to supply power in parallel to the load terminal 604. Each power supply includes a power converter 608, a negative feedback controller 610 to maintain regulation of the converters output voltage and a multi slope output impedance controller 612 to implement droop share to facilitate current sharing among the N power converters and to vary the effective output impedance Zeff_n to reduce an imbalance current and improve load regulation.

Each power converter 608 is depicted as a dependent source 614 in which a command voltage Vx_n is multiplied by a gain by a gain α_n to produce a controllable voltage Vc_n and is characterized by an open-loop output impedance Z_OL. The existence of energy source Vin is presumed in a dependent source. Voltage Vc_n is applied across an effective output impedance Zeff_n to supply an output current Iout_n at an output that is coupled through an external output impedance Z_ext_n to the load terminal 604. The total output impedance Zout_n=Zeff_n+Zext_n Negative feedback controller 610 is configured to provide a negative feedback loop in which a regulated voltage Vreg_n at the output is compared to a setpoint voltage Vsetpoint_n to control command Vx_n to maintain regulation of Vreg_n and an output voltage Vout at the load terminal for varying load currents IL. A bandwidth of the negative feedback loop that controls output voltage Vreg_n may vary with load current, Vin, Vout and switching frequency, which can be either modeled or measured. In general, the bandwidth may drop as the load current is reduced.

The multi slope output impedance controller 612 is configured to sense a current Isense_n indicative of Iout_n to control Vsetpoint_n such that Vreg_n is reduced as Iout_n is increased to facilitate load current sharing among the plurality of power supplies (e.g. the common droop share), command a high value of Z_eff_n when Iout_n is less than a specified value to reduce a current imbalance Ib between the power supplies and to command a low value of Z_eff_n when Iout_n is greater than the specified value to improve the regulation of the output voltage Vout. The "specified value" may be an actual threshold value of Iout_n or may be a proxy such as a time indicating progression in a controlled start-up. As will be discussed later, the controller may receive a mode input to configure the power controller for a parallel-connected configuration such as shown in FIG. 6 or for use as a single device, a start_sync input to synchronize start-up of the N power converters, a soft_start_1 input that receives an input to ramp up the converter output voltage in start-up and a frequency input responsive to a switching frequency of the power converter.

Figure 7:
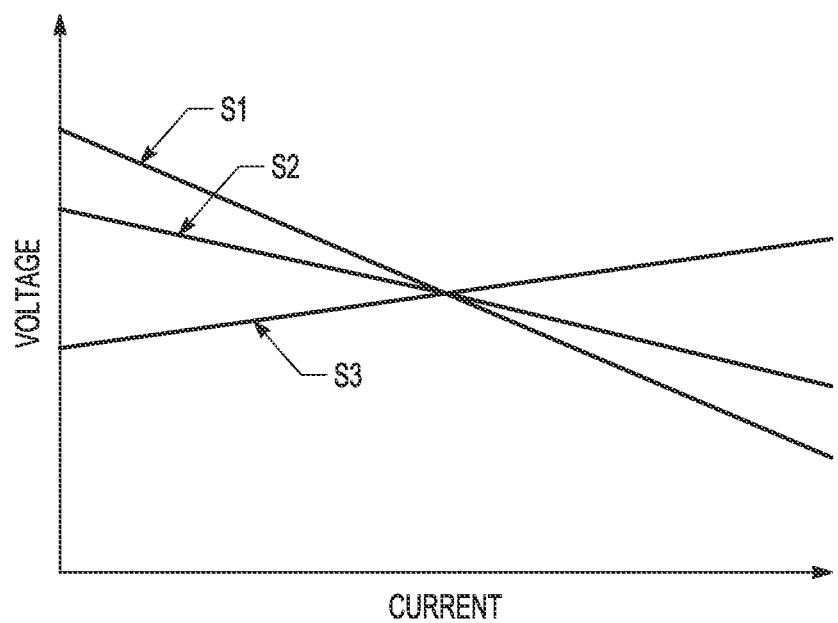
FIG. 7 is a plot of multiple load regulation slopes in a V/I plane indicative of different effective output impedances.

FIG. 7 is plot of a voltage/current (V/I) plane with different Zeff values (positive, less positive and negative) that produce different voltage regulation (Δv/Δi) which are the indicated slopes S1, S2, S3. Generally speaking S1 has a large negative slope (high positive Zeff) useful to facilitate droop share and to minimize the current imbalance when IL and Iout_n are small such as during the early stages of power supply start-up or for low load currents. S2 has a smaller negative slope (smaller positive Zeff) useful to maintain sharing as load regulation improves or load current increases. S3 may have a positive slope (negative Zeff) to counteract the external output impedance Zext to optimize load regulation at steady-state.

Figure 8:
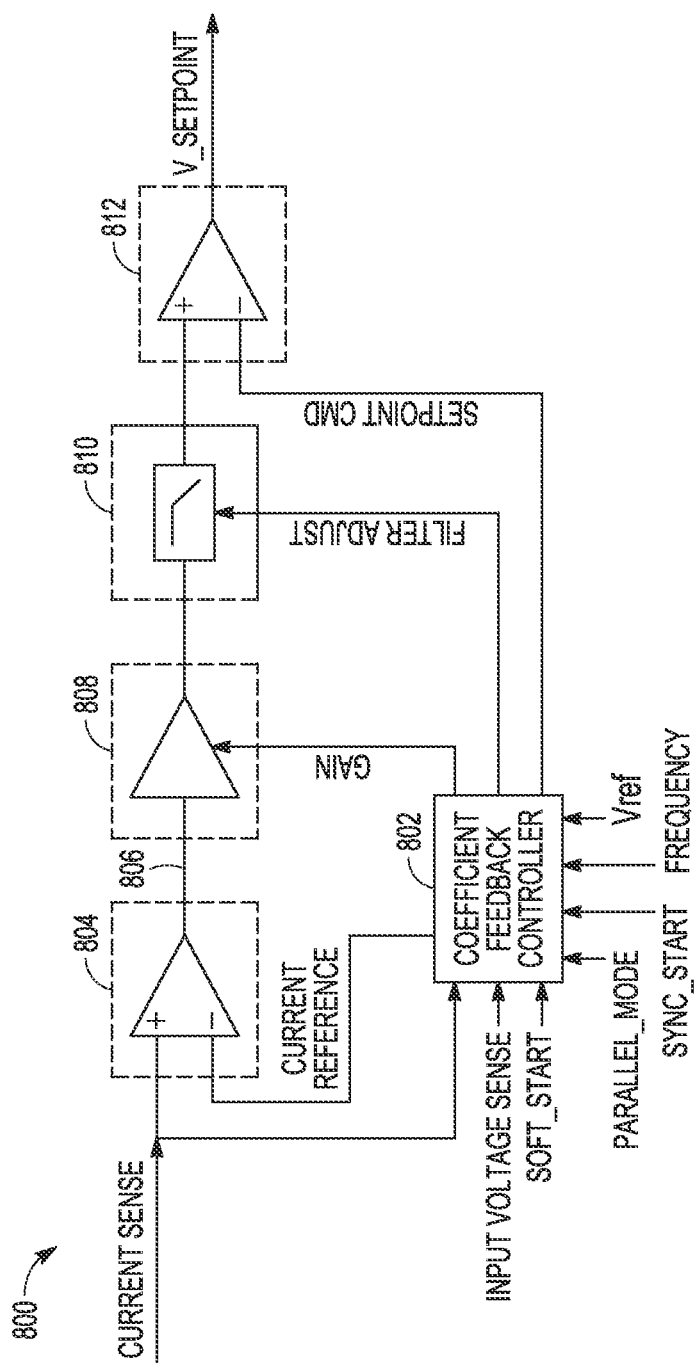
FIG. 8 illustrates an embodiment of a multi-slope output impedance controller to control the variable output impedance.

Referring now to FIG. 8, an embodiment of a multi slope output impedance controller 800 includes a coefficient generator controller 802 that drives effective output impedance Zeff_n as a function of sensed current Isense_n, a sensed input voltage (from which Iout_n can be calculated) and a switching frequency from which Iout_n can be calculated. The controller generates varying Zeff_n as a function of the command setpoint of the controller which then develop multiple droop share slopes such as illustrated in FIG. 7.

Controller 800 includes CGC 802 responsive to Isense_n, an input voltage sense, a switching frequency, and a voltage reference Vref_n to generate a current reference, a gain command, a filter command and a setpoint command. A current error amplifier 804 compares Isense_n to the current reference to generate an error signal 806. A programmable gain amplifier 808 is responsive to the gain command to command the high and low values of the Zeff_n and amplify the error signal. In general, a higher gain corresponds to a larger positive Zeff. A negative gain can be used to set a negative Zeff. A filter 810 is responsive to the filter command to filter the amplified error signal to limit a bandwidth of an output impedance control loop to be less than a bandwidth of the negative feedback loop that controls Vre to achieve the desired response and stability of the output impedance controller. In a preferred embodiment, the CGC generates the filter command such that the bandwidth of the output impedance control loop tracks the bandwidth of the negative feedback loop up and down so that the impedance bandwidth is as high as possible without interfering with the output voltage bandwidth to optimize performance. An amplifier 812 responsive to the filtered amplified error signal and the setpoint command generates an offset to the setpoint voltage Vsetpoint_n such that when Isense_n is greater than the current reference the setpoint voltage Vsetpoint_n is reduced. The controller may be implemented with analog functions, digital hardware, software or a combination thereof.

Figure 9:
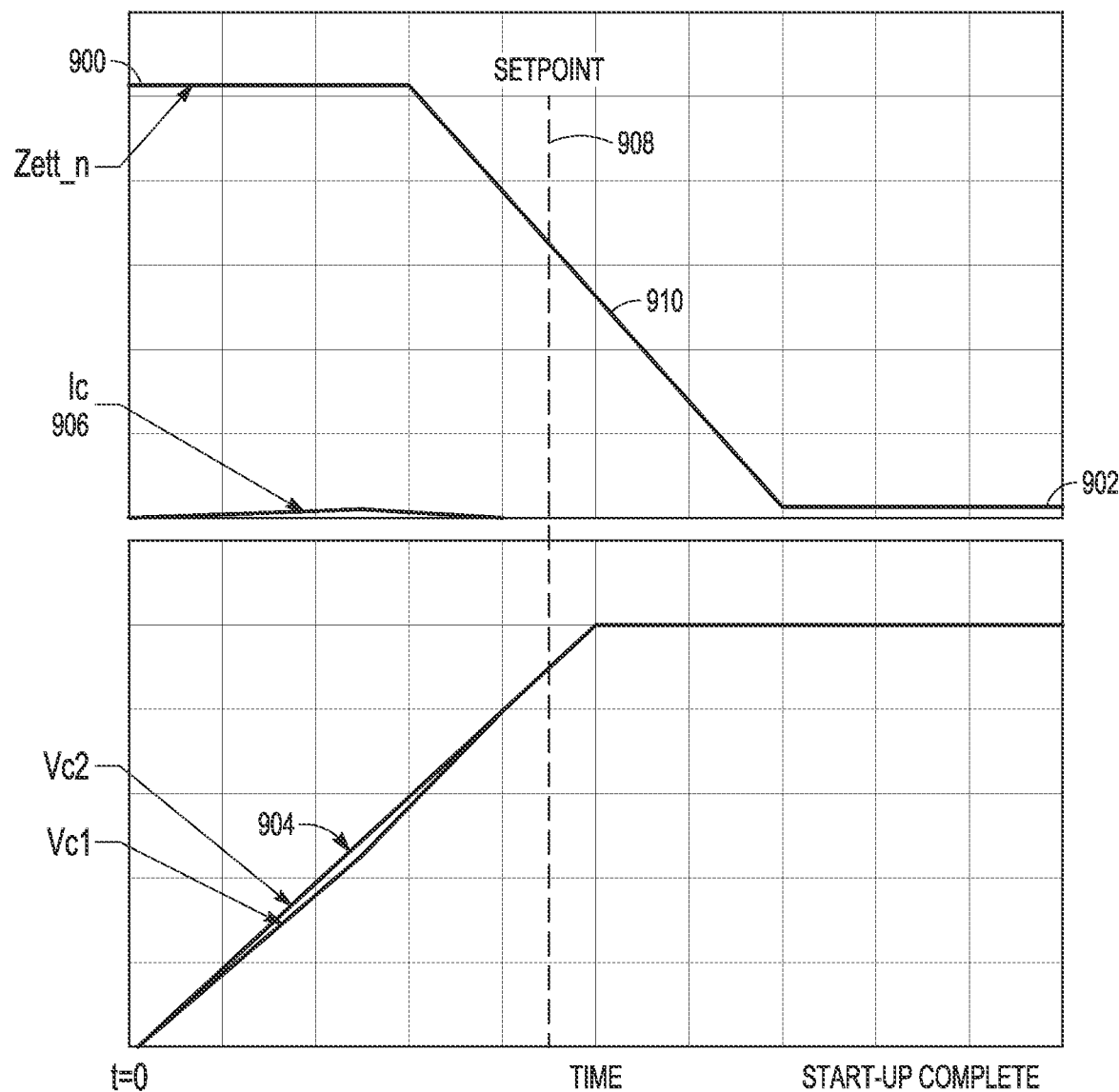
FIG. 9 is a plot illustrating a circulating current Ic between the actively-switched power converters during start-up in which the output impedance is varied between high and low levels over a start-up period to suppress Ic initially and then improve regulation.

Referring now to FIG. 9, each multi slope output impedance controller is responsive to a start sync command as shown in FIG. 6 to implement a start-up procedure to generate the command Vx_n to ramp voltage Vc_n, hence the regulated voltage Vreg_n up from an initial start value to an initial value for the setpoint voltage Vsetpoint_n while commanding Zeff_n to move from a high value 900 to a low value 902 over a start-up period. The function that drives the ramp over the start-up period is applied to the Soft_Start_n input of the controller. This function could be linear, piecewise linear, a step function or a higher order function that starts at the initial value (e.g. 0 volts) and ends at the final setpoint voltage. As shown, the exemplary ramp function is linear. In a preferred embodiment, the Start_sync inputs to all of the controllers are tied together so that all of the power converters start the ramping up of the output voltage, which will reduce the difference between voltages Vc_n. For example, each power converter will switch an enable command high or low to indicate the power converter is ready. When the last one is enabled, all of the power converters initiate start-up.

At initiation and until all of the output voltages of the power converters are adequately regulated, the difference 904 in output voltages Vc_1 and Vc_2 can be significant and lead to a severe current imbalance. In a synchronously rectified configuration this will cause a circulating current Ic 906 to flow between the power converters. Accordingly, the controller adjusts the programmable gain to a very high level to set the high value 900 for Zeff to drive Ic 906 to close to zero amps. As start-up progresses, Iout_n increases and exceeds a setpoint 908. This may be determined by monitoring Isense_n directly or via design of the controlled start-up procedure. Knowing the ramp function, Iout_n can be calculated with sufficient accuracy and reliability over the start-up period and the Iout_n setpoint mapped to a progression or specific time in the start-up procedure. Preferably the setpoint corresponds to a value of Iout_n>2*Ic under no load conditions. Once this condition is satisfied, Zeff can be switched low without concern of inducing the circulating current Ic.

In this particular example, Zeff_n does not switch directly from its high to low values but follows a transition 910 from the high to low values that spans setpoint 908. The transition between the high and low values of Zeff_n can be a single step, a sequence of steps, a linear transition or a linear or higher order function depending upon the particular implementation. When start-up is complete, each power converter will supply a nominal Iout_n value, for example, sufficient to supply load current at the middle of its range to enter steady-state. The output voltages of each of the converters are fairly well regulated and the current levels are within the supported range. At this point, the controller adjusts the programmable gain to a low level, and perhaps a negative value, to set the low value 902 for Zeff to improve, or optimize, load regulation during steady-state operations. A negative Zeff_n would partially offset the positive value of Zeff_n producing a smaller positive output impedance Zout_n still sufficient to facilitate sharing of the load current with optimum load regulation.

In the case of passively rectified power converters, the same procedure of setting Zeff_n to a high value at the onset of start-up and switching to a low value at the completion of start-up is followed. The desirable effect of having a high value of Zeff_n at the onset is to implement droop share at low levels of Iout_n so that the power converters start to share load current much earlier in the start-up procedure, which improves the overall reliability and efficiency of the power supply. A low value of Zeff_n at the completion of start-up improves load regulation for steady-state operation.

Figure 10:
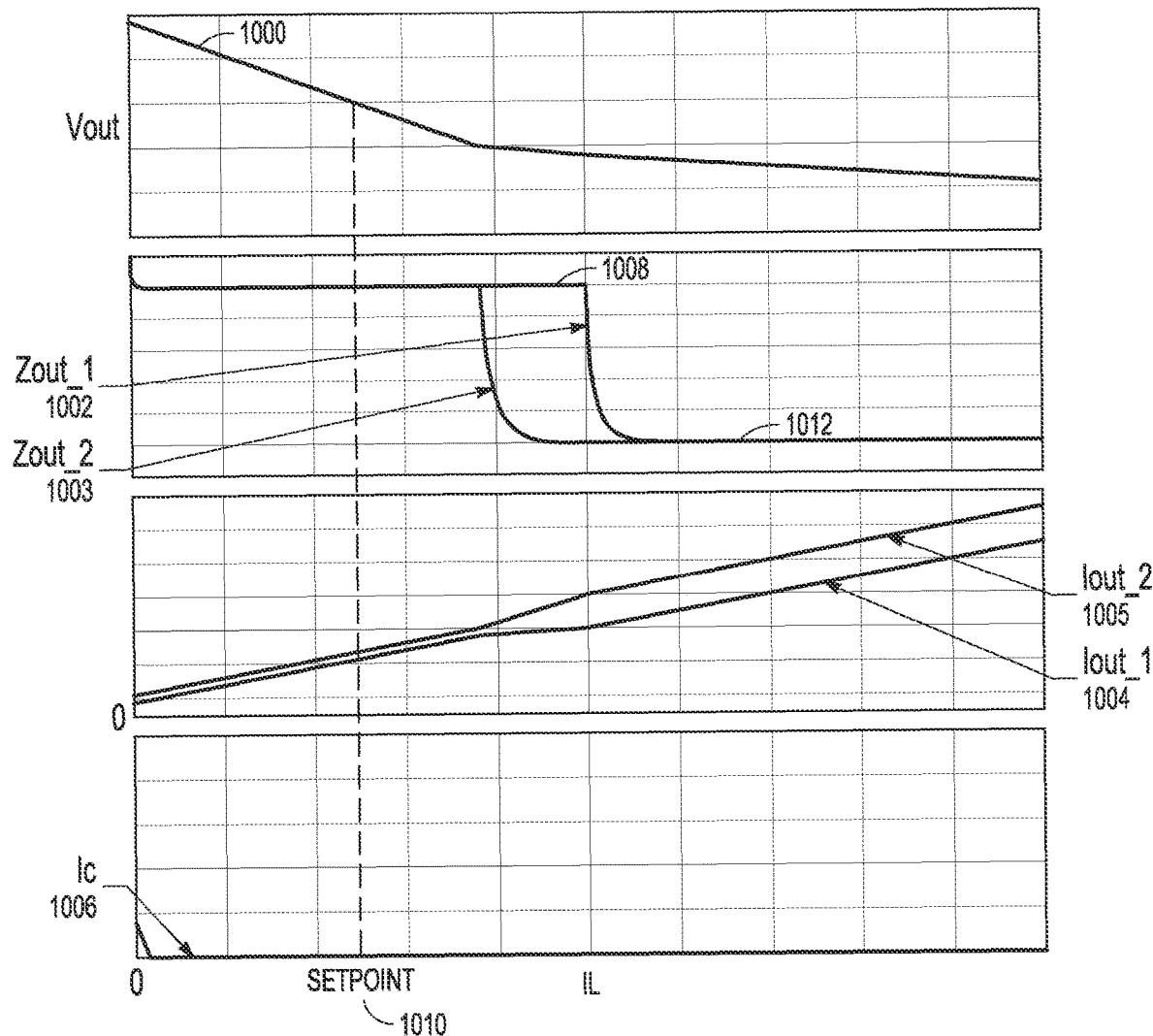
FIG. 10 is a plot illustrating a circulating current Ic between the actively-switched power converters during steady-state in which the output impedance is varied between high and low levels as a function of output current to suppress Ic at low current levels and to improve regulation at high current levels.

Referring now to FIG. 10, each multi slope output impedance controller is responsive to sense current Isense_n as an indicator of Iout_n and load current IL during steady-state. An output voltage Vout 1000 across the load, total output impedance Zout_1 1002 and Zout_2 1003, output currents Iout_1 1004 and Iout_2 1005 and a circulating current 1006 are plotted versus a level of load current IL. For synchronous rectification, when Iout<2*IC under no load then any difference in Vc_1 and Vc_2 will produce circulating current 1006. In steady-state this difference will be much smaller than during start-up, hence Ic will be much smaller but still undesirable. Therefore, the controller commands a high value 1008 for Zeff_1 and Zeff_2, hence Zout_1 and Zout_2, to minimize circulating current Ic for small load currents. Load regulation may be sacrificed to eliminate Ic but remains within a required regulation. For load currents above a setpoint 1010, the controller commands a low value 1012 for Zeff_1 and Zeff_2, hence Zout_1 and Zout_2, to improve load regulation. As shown the slope of the load line 1000 flattens when Zout is switched low indicating improved load regulation. The high values for Zeff_n may be negative to partially offset the positive value of Zext_n to optimize regulation. The transition between the high and low values of Zeff_n can be a single step, a sequence of steps, a linear transition or a linear or higher order function depending upon the particular implementation. As shown, the power converter that is contributing the most current Iout_n, here converter 2, will switch low first. In the synchronous rectifier case, the setpoint can be set at Iout=2*IC no load for each power converter. Below that point, Zeff_n should remain high to minimize Ic. Above that point, Zeff_n can be switched low as Ic is approximately zero regardless. The low value of Zeff_n must be sufficient to ensure sharing within the known potential variation of the Vc_n voltages of the converters at a known operating point.

The multi slope output impedance controller achieves better overall performance than the single slope output impedance controller, which must pick a fixed Zeff to support both start-up and steady-state operation of the power converters. The multi slope output impedance controller commands a high value of Zeff, higher than the fixed Zeff of the prior art, at low levels of Iout, which has the desirable effect of reducing the current imbalance between the power supplies. In the case of passively rectified converters, this has the desirable effect of forcing the converters to share the load current at lower levels during both start-up and steady-state. In the case of synchronously rectified converters, this has the desirable effect of essentially eliminating circulating current during both start-up and steady-state. In all cases, in the normal operating range of load currents at steady-steady state, the controller commands a low value of Zeff, lower than the fixed Zeff of the prior art, which improves the load regulation. The controller may even drive Zeff negative to optimize load regulation.

Figure 11:
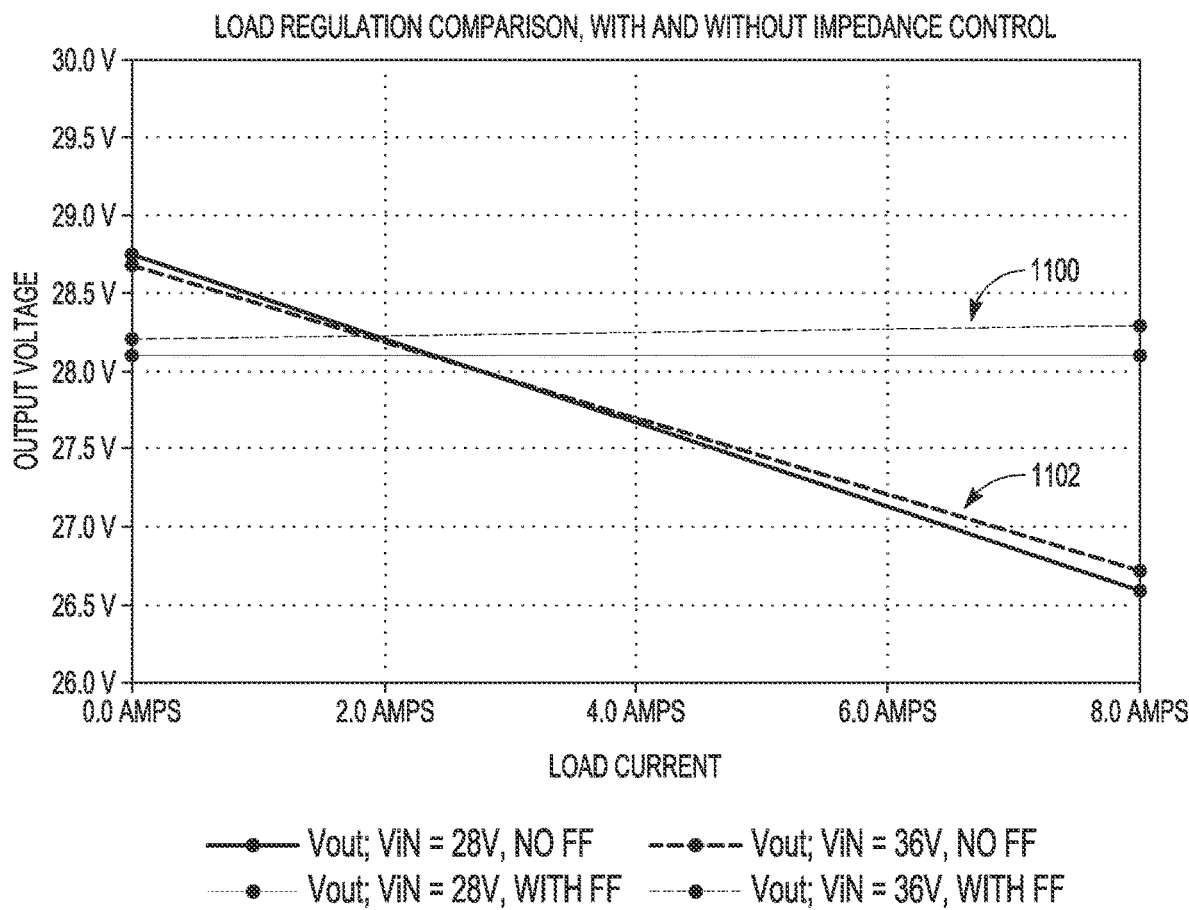
FIG. 11 is a plot of output voltage Vout versus load current IL illustrating the capability to configure the multi slope output impedance controller to provide optimal regulation for a single power supply.

Referring back to FIG. 6, multi slope output impedance controller includes a mode input that receives a command e.g., 0/1, that tells the controller whether it is being used in masterless configuration of N parallel-connected power converters or with a single power converter. For the former, the controller implements the start-up and steady-state procedures to set the high and low levels of Zeff_n to reduce the current imbalance and improve load regulation while facilitating sharing of the load current among all of the power converters. For the latter, the controller commands a negative gain for the programmable gain amplifier to set Zeff at a negative value to substantially offset the positive value of Zext to optimize regulation of the output voltage Vout. As shown in FIG. 11, a load line 1100 in which negative Zeff offsets positive Zest is approximately flat indicating optimized load regulation over the supported range of load current. By comparison, a load line 1102 in which Zeff was a positive value selected to enforce sharing among N parallel-connected power has a distinct negative slope indicating sub-optimal load regulation. The point being that the multi slope output impedance controller can be used for either the N parallel-connected power converters or a single power converter without changing the fundamental control algorithm. The controller may be used in any type of converter topology in switching or linear modes.

Figure 12:
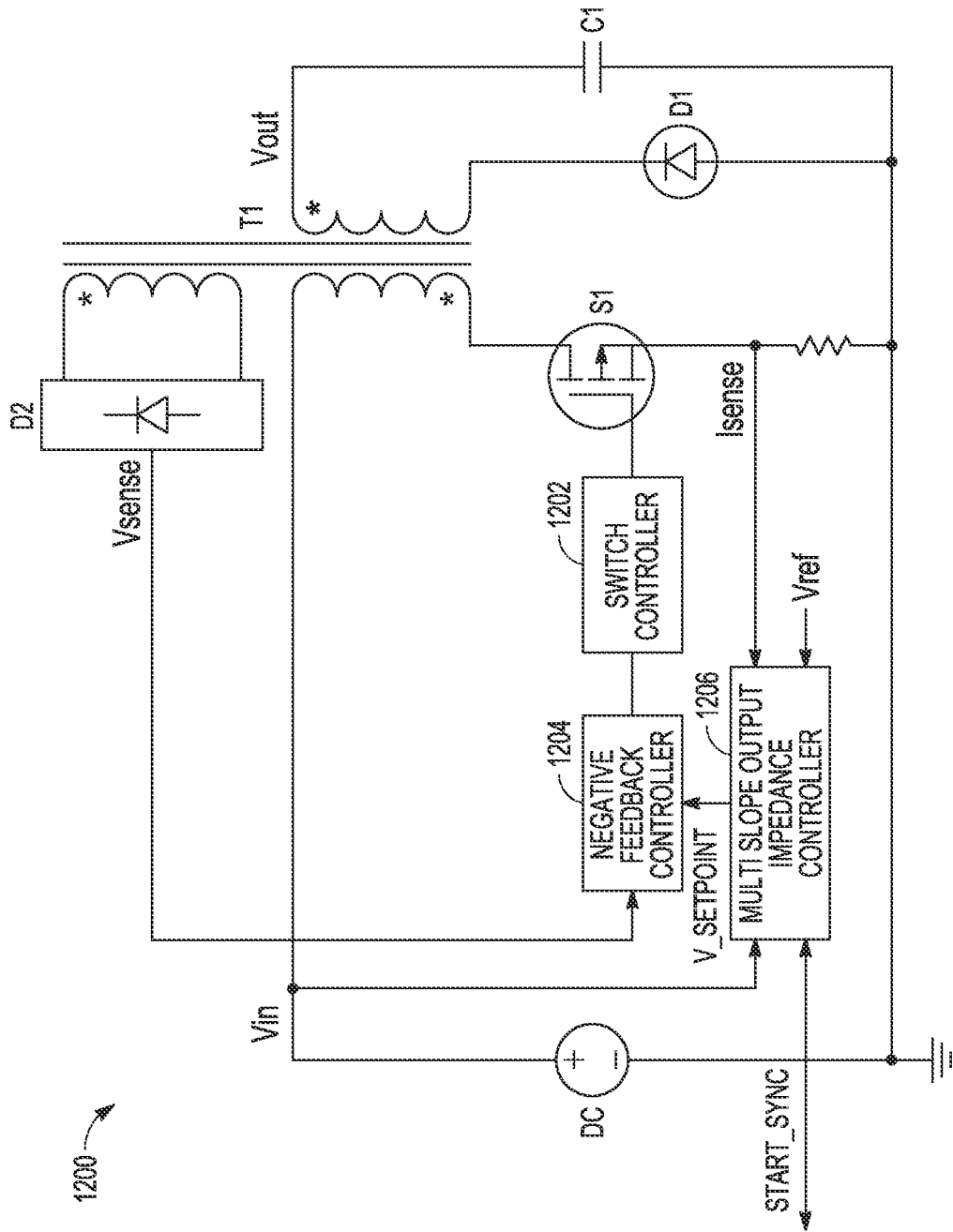
FIG. 12 is an embodiment of a flyback power converter with primary side regulation and passive rectification.

FIG. 12 illustrates an embodiment of a Flyback converter 1200 with primary side regulation and passive rectification. The flyback converter stores energy in transformer T1 during the time that active switch S1 is commanded on by the switch controller 1202. Due to the dot polarity of the windings of T1 when S1 is on both the output voltage Vout across a load C1 and sense Vsense winding rectifiers (D1 and D2 respectively) are reverse biased and thus conduct no energy. The converter's Vout is equivalent to the controllable voltage Vc_n in the dependent source model. When S1 is commanded off by the switch controller the winding voltages are reversed due to the stored energy in T1. In this state the rectifiers D1 and D2 conduct. Due to the dot polarity the voltage Vsense will be proportional to Vout. For example, if the turns ratio of T1 was unity for the Vout and Vsense windings, Vsense would be equal to Vout. A negative feedback controller 1204 senses the voltage Vsense and adjusts the duty cycle of the switch controller 1202 to regulate the converter to the desired setpoint. A multi slope output impedance controller 1206 controls the setpoint voltage Vsetpoint to vary effective output impedance Zeff as previously discussed.

Figure 13:
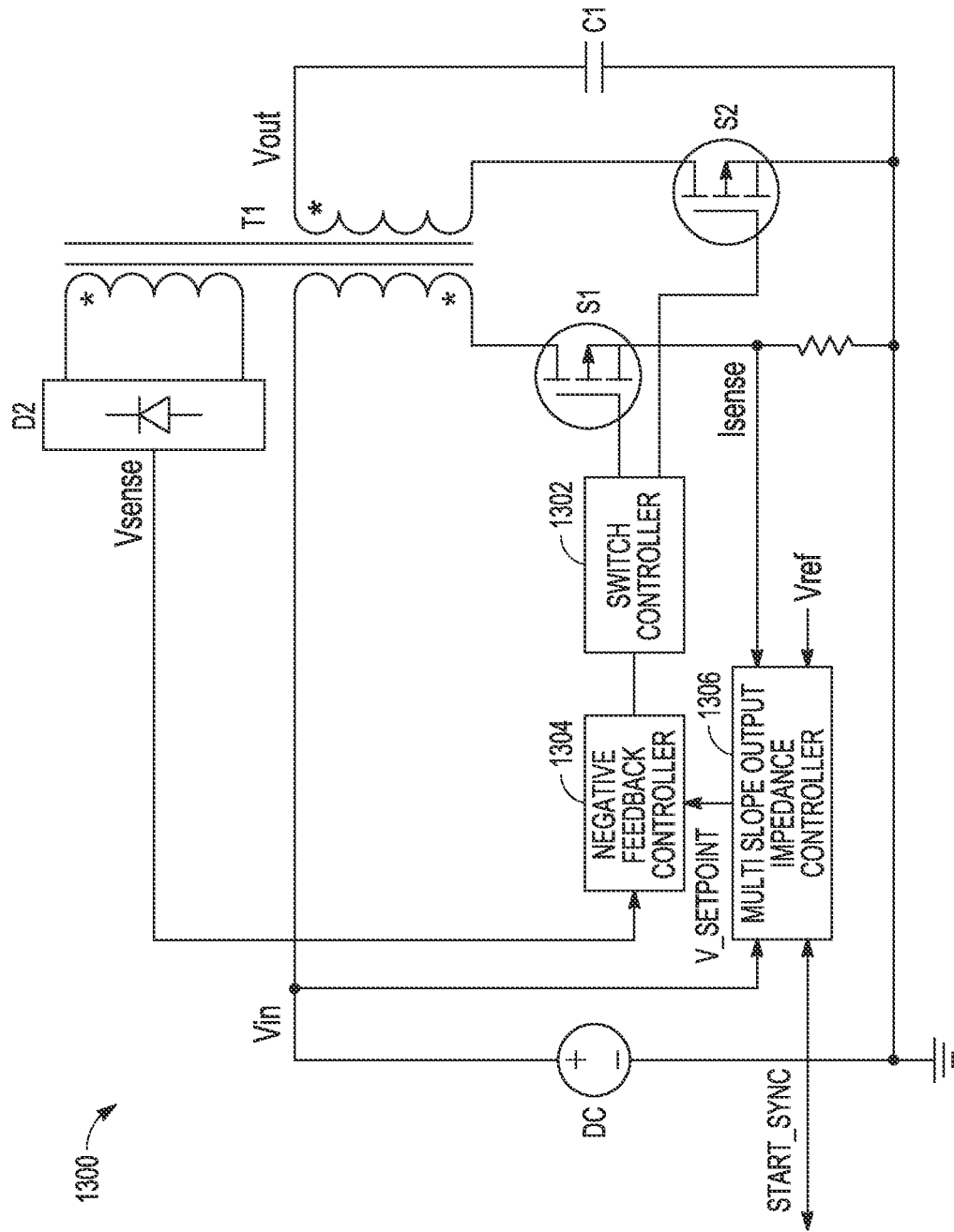
FIG. 13 is an embodiment of a flyback power converter with primary side regulation and synchronous rectification.

FIG. 13 shows a Flyback converter 1300 with primary side regulation with synchronous rectification. In this case the basic operation is identical but the passive rectifier (D1) is replaced with an active switch (S2) and a switch controller 1302 is modified to provide a control signal to S2 that is inverted from the signal driving S1. Due to the addition of the active rectifier, the converter 1300 of FIG. 13 can both sink and source current. A negative feedback controller 1304 and multi slope output impedance controller 1306 function as previous described to control the setpoint voltage Vsetpoint to vary effective output impedance Zeff and regulate the converter to the desired setpoint.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A regulated power supply configured to supply power to a common load connected at a load terminal, said power supply comprising:
   N parallel-connected power supplies in a masterless configuration configured to supply power to the load terminal where N is an integer of one or more, each said power supply comprising,
   a power converter responsive to a command Vx_n to generate a controllable voltage Vc_n across an effective output impedance Zeff_n to supply an output current Iout_n at an output that is coupled through an external output impedance Zext_n to the load terminal;
   a negative feedback controller configured to provide a negative feedback loop in which a regulated voltage Vreg_n at the output is compared to a setpoint voltage Vsetpoint_n to control the command Vx_n to maintain regulation of the regulated voltage Vreg_n and an output voltage Vout at the load terminal for varying load currents IL; and
   a multi slope output impedance controller responsive to a current Isense_n indicative of the output current Iout_n to control the setpoint voltage Vsetpoint_n such that the regulated voltage Vreg_n is reduced as the output current Iout_n is increased to facilitate load current sharing among the plurality of power supplies, command a high value of the effective output impedance Zeff_n when the output current Iout_n is less than a specified value to reduce a current imbalance Ib between the power supplies and to command a low value of the effective output impedance Zeff_n when the output current Iout_n is greater than the specified value to improve the regulation of the output voltage Vout
   wherein the multi slope output impedance controller is responsive to a mode input to select single or multiple power converter configurations,
   wherein in the multiple configuration of N>1, the controller is configured to reduce the setpoint voltage Vsetpoint_n as the output current Iout_n increases to facilitate load current sharing among the plurality of power supplies and to command the high value of the Zeff_n for the Iout_n less than the specified value to reduce the current imbalance Ib and to command the low value of the Zeff_n for the Iout_n greater than the specified value to improve load regulation;
   wherein in the single configuration of N=1, the controller is configured to set a negative value for the Zeff_n to substantially offset a positive value of the Zext_n to increase the setpoint voltage Vsetpoint_n as the output current Iout_n increases to improve load regulation.

2. The regulated power supply of claim 1, wherein the multi slope output impedance controller comprises:
   a coefficient generator controller (CGC) responsive to the current Isense_n and a voltage reference Vref_n to generate a current reference, a gain command, a filter command and a setpoint command;

a current error amplifier that compares the current Isense_n to the current reference to generate an error signal;

a programmable gain amplifier responsive to the gain command to command the high and low values of the effective output impedance Zeff_n and amplify the error signal;

a filter responsive to the filter command to filter the amplified error signal to limit a bandwidth of an output impedance control loop to be less than a bandwidth of the negative feedback loop that controls the regulated voltage Vreg; and an amplifier responsive to the filtered amplified error signal and the setpoint command to generate the setpoint voltage Vsetpoint_n such that when the current Isense_n is greater than the current reference the setpoint voltage Vsetpoint_n is reduced.

3. The regulated power supply of claim 2, wherein the CGC configures the filter via the filter command such that the bandwidth of the output impedance control loop tracks the bandwidth of the negative feedback loop that controls the regulated voltage Vreg.

4. The regulated power supply of claim 2, wherein the CGC is configurable during steady-state to generate the gain command to set a negative gain, hence a negative value of the effective output impedance Zeff_n as the low value to partially offset a positive value of the external output impedance Zext_n to reduce a total positive output impedance Zout_n to improve regulation while facilitating load current sharing among the plurality of power supplies.

5. The regulated power supply of claim 1, wherein each power converter is passively rectified to exclusively-or (XOR) sink or source the output current Iout_n to the load terminal, wherein the controller commands the high and low values of the effective output impedance Zeff_n such that all N PCs share in the sinking or sourcing of the load current over a specified range of supported load currents.

6. The regulated power supply of claim 1, wherein each power converter is synchronously rectified to sink and source the output current Iout_n to the load terminal, wherein the controller commands the low value of the effective output impedance Zeff_n when the output current Iout>2*IC under no load such that IC under load is approximately zero where IC is a circulating current between the power supplies.

7. The regulated power supply of claim 1, wherein each said multi slope output impedance controller is responsive to a start sync command to implement a start-up procedure to generate the command Vx_n to ramp the controllable voltage Vc_n, hence the regulated voltage Vreg_n up from an initial start value to an initial value for the setpoint voltage Vsetpoint_n while commanding the effective output impedance Zeff_n to move from the high value to the low value over a start-up period.

8. The regulated power supply of claim 7, wherein all of the multi slope output impedance controllers are configured to receive a common start sync command to initialize the start-up procedure.

9. The regulated power supply of claim 7, wherein each said multi slope output impedance controller is configured to command the high value of the effective output impedance Zeff_n to facilitate load current sharing and reduce the current imbalance Ib at the onset of the start-up procedure and to command the low value of the effective output impedance Zeff_n, which is set at a nominal value for steady-state operation, once the output current Iout_n is of sufficient magnitude to facilitate load current sharing at the low value of the effective output impedance Zeff_n.

10. The regulated power supply of claim 1, wherein each said multi slope output impedance controller is configured to implement a steady-state procedure in which the command Vx_n is generated to control the controllable voltage Vc_n to control regulation of the output voltage Vout while commanding the effective output impedance Zeff_n in response to the current Isense to move between the high and lows values as the current Isense changes such that the effective output impedance Zeff_n decreases as the output current Iout_n increases.

11. The regulated power supply of claim 10, wherein the output impedance controller is configurable during steady-state to set a negative value for the effective output impedance Zeff_n to partially offset a positive value for the external output impedance Zext_n to reduce a total positive output impedance Zout to improve regulation while maintain sharing of the load current among the power supplies.

12. The regulated power supply of claim 1, wherein each said multi slope output impedance controller is configured to implement a start-up procedure and a steady-state procedure, wherein during the start-up procedure, the controller is responsive to a start sync command to generate the command Vx_n to ramp the controllable voltage Vc_n, hence the regulated voltage Vreg_n up from zero volts to the setpoint voltage Vsetpoint_n while commanding the effective output impedance Zeff_n to move from a start-up high value to reduce the current imbalance Ib to a start-up low value to improve load regulation over a start-up period; and wherein during the steady-state procedure, the controller is response to the command Vx_n to control regulation of the output voltage Vout while commanding the effective output impedance Zeff_n to move between steady-state high and low values as the current Isense changes such that the effective output impedance Zeff_n decreases as the output current Iout_n increases to reduce the current imbalance Ib when the output current Iout_n is low and to improve load regulation when the output current Iout_n is high.

13. The regulated power supply of claim 1, wherein in the multiple configuration of N>1, the controller is configured to implement a start-up procedure and a steady-state procedure, wherein during the start-up procedure, the controller is responsive to a start sync command to generate the command Vx_n to ramp voltage Vc_n, hence the regulated voltage Vreg_n up from zero volts to the setpoint voltage Vsetpoint_n while commanding the Zeff_n to move from a start-up high value to reduce the current imbalance Ib to a start-up low value to improve load regulation over a start-up period; and wherein during the steady-state procedure, the controller is response to the command Vx_n to control regulation of the Vout while commanding the Zeff_n in response to the Isense to move between steady-state high and low values as the Isense changes such that the Zeff_n decreases as the Iout_n increases to reduce current imbalance Ib when the Iout_n is low and to improve load regulation when the Iout_n is high.

14. A regulated power supply configured to supply power to a common load connected at a load terminal, said power supply comprising:

N parallel-connected power supplies in a masterless configuration configured to supply power to the load terminal where N is an integer of one or more, each said power supply comprising, a power converter responsive to a command $Vx\_n$ to generate a controllable voltage $Vc\_n$ across an effective output impedance $Zeff\_n$ to supply an output current $Iout\_n$ at an output that is coupled through an external impedance $Zext\_n$ to the load terminal;

a negative feedback controller is connected to provide a negative feedback loop in which a regulated voltage $Vreg\_n$ at the output is compared to a setpoint voltage $Vsetpoint\_n$ to control command $Vx\_n$ to regulate the regulated voltage $Vreg\_n$ and an output voltage Vout at the load terminal for varying load currents Iload; and a multi slope output impedance controller configured to sense a current $Isense\_n$ indicative of the output current $Iout\_n$ to control the setpoint voltage $Vsetpoint\_n$ to control the regulation of the regulated voltage $Vreg\_n$ and the output voltage Vout, said controller being responsive to a mode input to select either a single power supply or a multiple power supply configuration, wherein in the multiple configuration of N>1, the controller is configured to reduce the setpoint voltage $Vsetpoint\_n$ as the output current $Iout\_n$ increases to facilitate load current sharing among the plurality of power supplies, command a high value of the effective output impedance $Zeff\_n$ for the output current $Iout\_n$ less than a specified value to reduce a current imbalance Ib between the power supplies and to command a low value of the effective output impedance $Zeff\_n$ for the output current $Iout\_n$ greater than the specified value to improve regulation; and wherein in the single configuration of N=1, the controller is configured to set a negative value for the effective output impedance $Zeff\_n$ to substantially offset a positive value of the external impedance $Zext\_n$ to increase the setpoint voltage $Vsetpoint\_n$ as the output current $Iout\_n$ increases to improve load regulation.

15. The regulated power supply of claim 14, wherein in the multiple configuration of N>1, the controller is configured to implement a start-up procedure and a steady-state procedure, wherein during the start-up procedure, the controller is responsive to a start sync command to generate the command $Vx\_n$ to ramp the controllable voltage $Vc\_n$, hence the regulated voltage $Vreg\_n$ up from an initial value to the setpoint voltage $Vsetpoint\_n$ while commanding the effective output impedance $Zeff\_n$ to move from a start-up high value to reduce the current imbalance Ib to a start-up low value to improve load regulation over a start-up period; and wherein during the steady-state procedure, the controller is response to the command $Vx\_n$ to control regulation of the output voltage Vout while commanding the effective output impedance $Zeff\_n$ in response to the current Isense to move between a steady-state high and low values as the current $Isense\_n$ changes such that the effective output impedance $Zeff\_n$ decreases as the output current Tout n increases to reduce the current imbalance Ib when the output current $Iout\_n$ is low and to improve load regulation when the output current $Iout\_n$ is high.

16. The regulated power supply of claim 14, wherein the multi slope output impedance controller comprises:

a coefficient generator controller (CGC) responsive to the current $Isense\_n$ and a voltage reference $Vref\_n$ to generate a current reference, a gain command, a filter command and a setpoint command;

a current error amplifier that compares the current $Isense\_n$ to the current reference to generate an error signal;

a programmable gain amplifier responsive to the gain command to command the high and low values of the effective output impedance $Zeff\_n$ and amplify the error signal;

a filter responsive to the filter command to filter the amplified error signal to limit a bandwidth of an output impedance control loop to be less than a bandwidth of the negative feedback loop that controls the regulated voltage Vreg; and an amplifier responsive to the filtered amplified error signal and the setpoint command to generate the setpoint voltage $Vsetpoint\_n$ such that when the current $Isense\_n$ is greater than the current reference the setpoint voltage $Vsetpoint\_n$ is reduced.

17. The regulated power supply of claim 16, wherein the CGC configures the filter such that the bandwidth of the output impedance control loop tracks the bandwidth of the negative feedback loop that controls the regulated voltage Vreg.

18. The regulated power supply of claim 16, wherein the CGC is configurable during steady-state to generate the gain command to set a negative gain, hence a negative value of the effective output impedance $Zeff\_n$ to partially offset a positive value of the external impedance $Zext\_n$ to reduce a total positive output impedance $Zout\_n$ to improve regulation while facilitating load current sharing among the plurality of power supplies.

19. The regulated power supply of claim 15, wherein each power converter is actively rectified to sink and source the output current Iout to the load terminal, wherein for N>1 the controller commands the low value of the effective output impedance $Zeff\_n$ when the output current Iout>2*IC under no load such that IC under load is approximately zero where IC is a circulating current between the power supplies.

* * * * *